United States Patent

[11] 3,541,996

| [72] | Inventors | Norman D. Brockelsby<br>Grand Island;<br>William K. Evers, Hastings, Nebraska |
|---|---|---|
| [21] | Appl. No. | 720,300 |
| [22] | Filed | April 10, 1968 |
| [45] | Patented | Nov. 24, 1970 |
| [73] | Assignee | EBKO Industries Inc.<br>Juniata, Nebraska |

[54] AUTOMATIC SPRAYER APPARATUS
7 Claims, 12 Drawing Figs.

[52] U.S. Cl. .................................................. 119/159,
103/150
[51] Int. Cl. ...................................... A01k 13/00,
A01k 29/00
[50] Field of Search ........................................ 119/159,
75; 103/150

[56] References Cited
UNITED STATES PATENTS

| 1,604,303 | 10/1926 | Peck et al. | 119/159 |
| 1,986,928 | 1/1935 | Hanson | 119/75 |
| 2,316,932 | 4/1943 | Bruce | 119/159 |
| 2,900,957 | 8/1959 | Peterson | 119/159 |
| 3,032,011 | 5/1962 | Stramel | 119/159 |
| 3,173,402 | 3/1965 | Cassel | 119/159 |
| 3,273,584 | 9/1966 | Kennepohl | 103/150X |

Primary Examiner—Aldrich F. Medbery
Attorney—John H. Widdowson and Phillip A. Rein ABSTRACT: This invention relates to an automatic sprayer apparatus and, more particularly, to a device used to dispense predetermined amounts of fluids such as insecticides upon animals which actuate the same. Still, more specifically, this invention relates to a sprayer apparatus including a U-shaped housing adapted to fit about the periphery of an entranceway having pump and spray actuator means connected to sidewalls of the housing each having an elongated actuator arm adapted to be moved by an animal in order to pump under air pressure a predetermined amount of fluid through spray nozzle assemblies at a given smooth rate.

Numerous types of sprayer structures are known in the prior art operable to dispense oil or the like onto animals passing through swinging type gates. However, the prior art devices are normally dependent upon an exterior source of power as an electrical supply and are not completely self-operable to dispense a predetermined amount of fluid onto the respective animals. In fact, the prior art devices are generally dangerous to use with insecticide fluids and the like as an animal can actuate the dispensing means a plurality of times and an overdose of the fluid may prove fatal to the animal. Additionally, the prior art devices are costly to manufacture, generally unreliable in operation, and not operable to dispense a predetermined fluid quantity at a desired even spray for most efficient end results.

Patented Nov. 24, 1970
3,541,996
Sheet 1 of 3
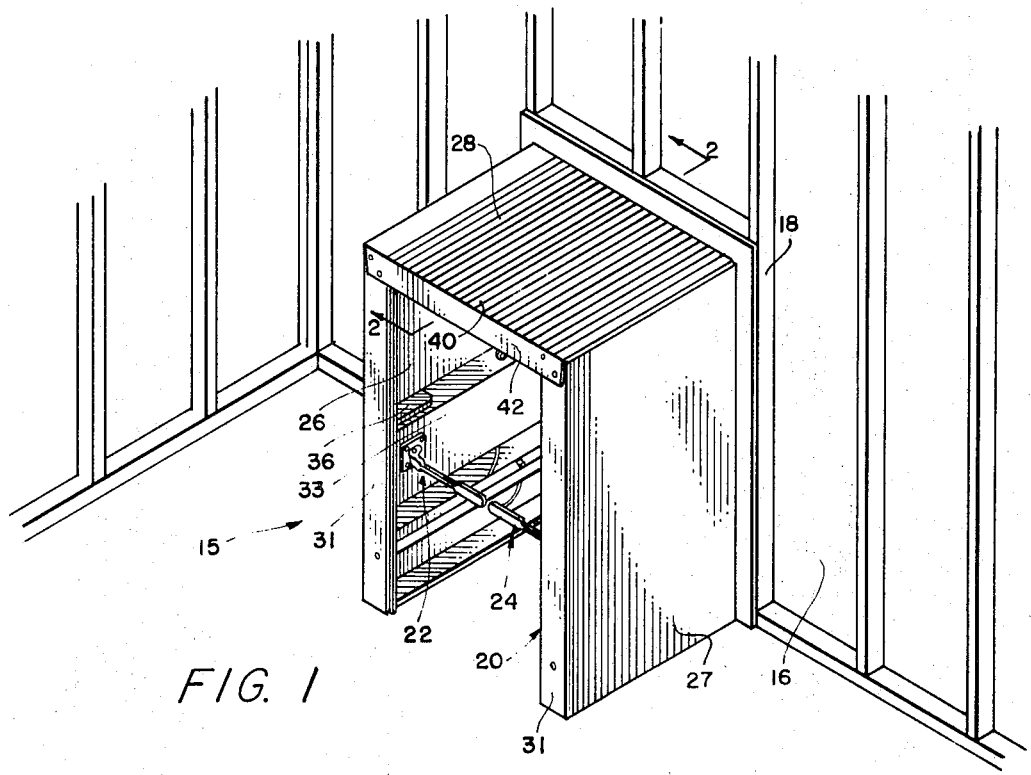
FIG. 1
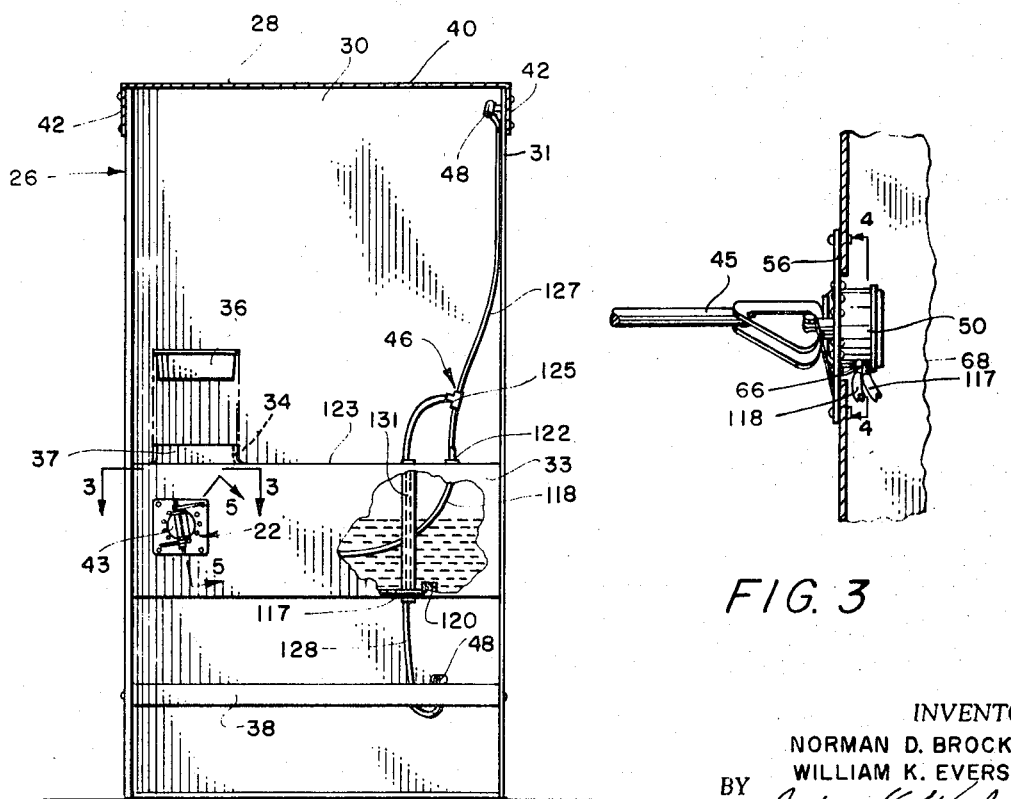
FIG. 2
FIG. 3
INVENTOR.
NORMAN D. BROCKELSBY
WILLIAM K. EVERS
BY
ATTORNEYS

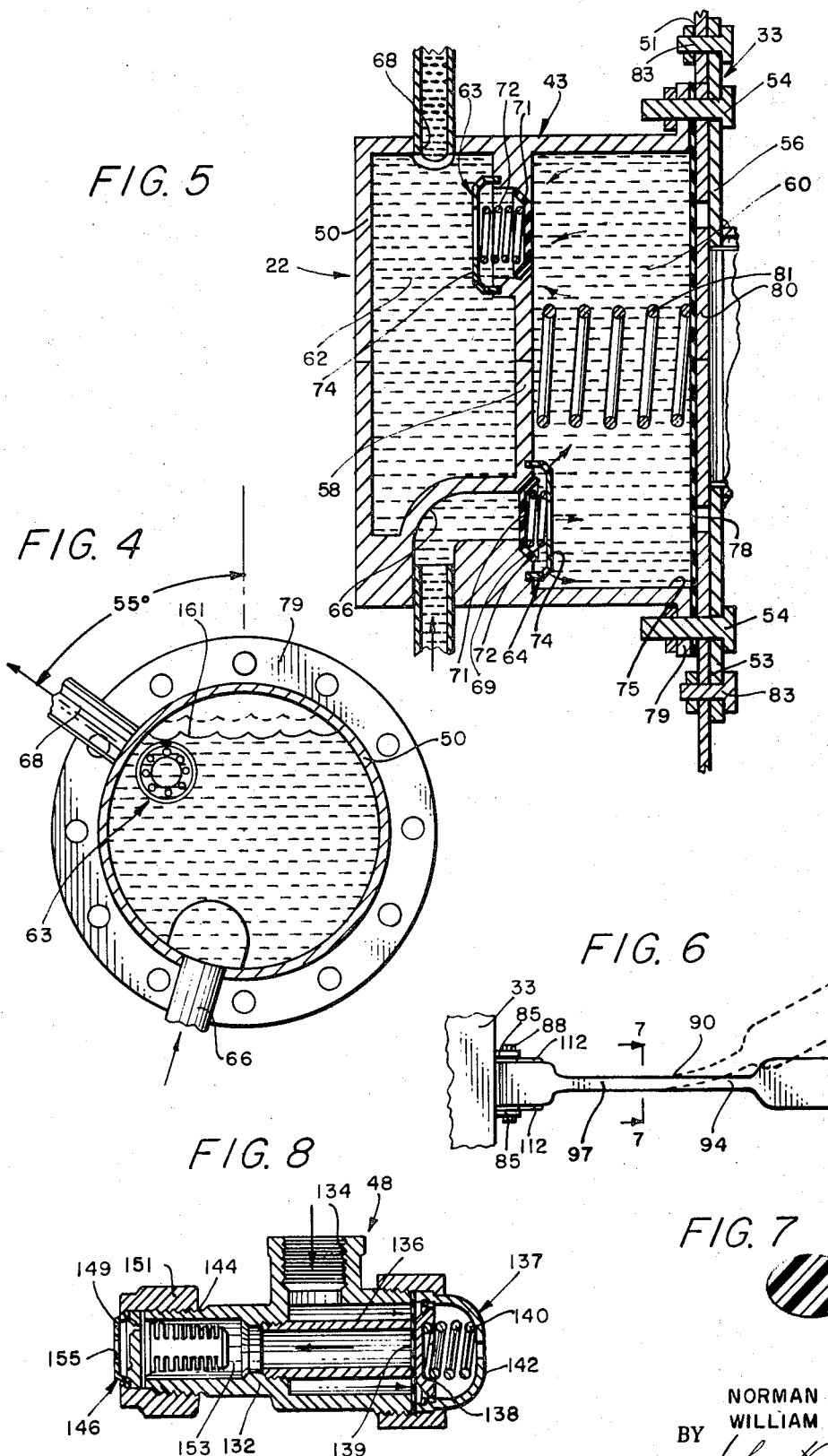

Patented Nov. 24, 1970

INVENTOR.
NORMAN D. BROCKELSBY
WILLIAM K. EVERS

BY John H. Widdowson
Phillip A. Wein
ATTORNEYS

AUTOMATIC SPRAYER APPARATUS

In a preferred specific embodiment of this invention, an automatic sprayer apparatus is provided including a generally U-shaped housing having parallel upright support walls adapted to be placed adjacent, for example, the periphery of an entrance into a dairy barn and having pump and spray actuator means connected to respective ones of the support walls. Each support wall is provided with a fluid containing compartment having the pump and spray actuator means connected thereto adapted to receive fluid therefrom for flow through conduits to a pair of spaced spray nozzle assemblies secured to the respective support wall in a predetermined location. Each pump and spray actuator means includes a pump means having an elongated actuator arm assembly connected thereto. The pump means is provided with inlet and outlet conduits and a main housing which is bolted in a predetermined angular position onto the support wall of the fluid containing compartment. The pump means is of a diaphragm type operable through a movable plate secured to the fluid compartment as by an anchor plate adapted to receive a connecter pin therethrough for attachment of the actuator arm assembly thereto for pivotal movement. The actuator arm assembly is provided with an elongated arm having a central shaft portion with an actuator section at one end and a cam section at the other. Additionally, the actuator arm assembly is provided with a pair of spaced alinement springs to maintain the actuator arm in the inactive position extended substantially perpendicular to the diaphragm plate. The actuator arm is pivotal about the connecter pin as by an animal moving against the same whereupon the cam section depresses the diaphragm plate in order to provide fluid compression within the pump means for dispensing of the fluid through the conduits to the respective spray nozzle assemblies. The pump means is specially constructed and mounted on the respective support walls to provide for a desired air compression therein for pressure movement of the fluid therein at a predetermined rate outwardly to the spray nozzle assemblies. Additionally, the cam sections of the respective actuator arms are of a particular design to cause full movement of the diaphragm plate upon the initial forty-five degree movement thereof so that the animal actuating may only receive a predetermined amount of fluid therefrom.

One object of this invention is to provide an automatic sprayer apparatus overcoming the above mentioned disadvantages of the prior art devices.

Another object of this invention is to provide a sprayer apparatus operable without an external power source required having actuator arms movable by animals moving between a U-shaped support housing for dispensing a predetermined amount of fluid therefrom.

A still further object of this invention is to provide an automatic sprayer apparatus having a U-shaped housing means adapted to be placed about the periphery of a doorway entrance; fluid compartments attached to opposed sides of the housing; a pump and spray actuator means connected to each fluid compartment adapted to receive the fluid therefrom having actuator arms operably connected to a pump means extended across the opening between the support walls whereby an animal moving the actuator arms operates the pump means in order to dispense a predetermined amount of fluid therefrom through properly spaced spray nozzle assemblies.

One further object of this invention is to provide a sprayer apparatus having a diaphragm pump means operable to compress a predetermined amount of air within the output chamber so that the compressed air operates to maintain a constant fluid flow therefrom.

One object of this invention is to provide a sprayer apparatus having a diaphragm pump means operated by an actuator arm assembly having a particular cam design in order to control operation in only one direction after a given movement for dispensing a predetermined amount of fluid.

One other object of this invention is to provide a sprayer apparatus constructed of corrosion resistant material that is economical to manufacture, easy to maintain, and reliable in operation.

Various other objects, advantages, and features of the invention will become apparent to those skilled in the art from the following discussion taken in conjunction with the accompanying drawings, in which:

FIG. 1 is a perspective view of the automatic sprayer apparatus of this invention as mounted in a doorway opening in a diary barn or the like;

FIG. 2 is an enlarged sectional view taken along line 2-2 in FIG. 1;

FIG. 3 is an enlarged fragmentary sectional view taken along line 3-3 in FIG. 2;

FIG. 4 is an enlarged sectional view taken along line 4-4 in FIG. 3;

FIG. 5 is an enlarged fragmentary sectional view taken along line 5-5 in FIG. 2;

FIG. 6 is a fragmentary elevational view illustrating the actuator arm assembly of the sprayer apparatus of this invention;

FIG. 7 is an enlarged sectional view taken along line 7-7 in FIG. 6;

FIG. 8 is an enlarged sectional view of a nozzle member of the nozzle assembly of the sprayer apparatus of this invention;

Figure 9:
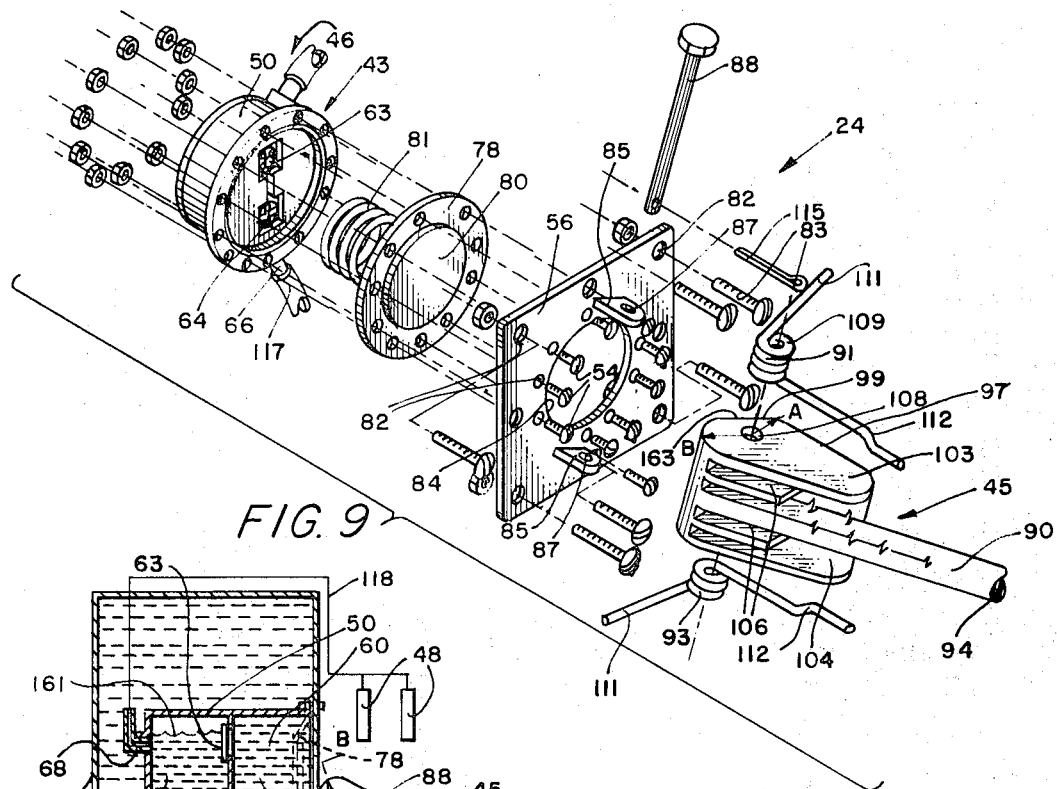
FIG. 9 is an exploded fragmentary perspective view of one of the pump and spray actuator means and the actuator arm assembly of the sprayer apparatus of this invention.

The following is a discussion and description of preferred specific embodiments of the sprayer apparatus of this invention, such being made with reference to the drawings, whereupon the same reference numerals are used to indicate the same or similar parts and/or structures. It is to be understood that such discussion and description is not to unduly limit the scope of the invention.

Referring now to the drawings in detail and in particular to FIG. 1, the automatic sprayer apparatus of the invention, indicated generally at 15, is shown as extended adjacent a wall 16 in a dairy barn or the like in about the periphery of a door frame 18. This device may easily be mounted, for example adjacent an exit door to a dairy barn whereupon the cows leaving the barn area would themselves activate the sprayer apparatus 15 as will be explained.

The automatic sprayer apparatus 15 includes an upright U-shaped housing means 20 having pump and sprayer actuator means 22 and 24 connected thereto. More specifically, the housing means 20 is provided with upright sidewall assemblies 26 and 27 interconnected at the upper most ends as by a top wall assembly 28. As the sidewall assemblies 26 and 27 are substantially identical, only one need be described in detail. The sidewall assembly 26 includes an upright integral main body or plate member 30 having inwardly turned edge sections 31 adapted to support a fluid containing compartment 33 therebetween. The fluid containing compartment 33 is of a generally enlarged rectangular box shape secured as by adhesive or the like to the inner portion of the main body 30 and having an enlarged upper opening 34 adapted to receive a bowl shaped cap member 36 therein. The opening 34 is provided with an upturned flange 37 thereabout with the large size of the opening 34 for maintenance and repair of this apparatus as will become obvious. As shown in FIG. 2, an intermediate support strut member 38 is provided connected between the end sections 31 for rigidity.

The top wall assembly 28 is provided with a plate section 40 having downwardly turned side flanges 42 secured as by bolts or the like to the respective upper ends of the sidewall assemblies 26 and 27. The housing means 20 of this invention is preferably constructed of a molded fiberglass material so that the same is light weight, attractive in appearance, durable, and highly resistant to corrosion which is desirable for usage in spraying insecticides or the like.

The pump and spray actuator means 22 and 24 are connected to the sidewall assemblies 26 and 27, respectively, and, more particularly, secured to the respective fluid containing compartments 33 thereon. As the pump and spray actuator means 22 and 24 are substantially identical, only one need be described in detail. The pump and spray actuator means 24 includes a pump means 43 mounted within the respective fluid compartment 33 having an actuator arm assembly 45 operably connected thereto operable to actuate the pump means 43 for fluid flow through a conduit means 46 to a pair of spaced nozzle assemblies 48.

As best shown in FIGS. 5 and 9, the pump means 43 includes a main housing 50 secured to the inside surface 51 of an inner wall 53 of the fluid compartment 33 by a plurality of spaced bolt members 54 additionally extended through an anchor plate 56 placed against the wall 53. The main housing 50 is divided by an intermediate wall 58 into a fluid intake chamber 60 and a fluid output chamber 62 and having check valve assemblies 63 and 64 mounted in the intermediate wall 58. A fluid inlet channel 66 is provided in the main housing 50 to pass fluid in one direction through the lower intake check valve assembly 64. An outlet channel 68 is extended into the fluid output section 62 to receive fluid forced through the upper output check valve assembly 63 in one direction. More specifically, the intake check valve assembly 64 is provided with a seat 69 about the inlet channel 66 having a seat member 71 engagable therewith and held biased in the closed position as by a compression spring member 72 held by a retainer ring 74 secured to the intermediate wall 58. The output check valve assembly 63 is the same having an identical retainer ring 74, seat member 71, and compression spring member 72 but operable in an opposite manner to permit fluid flow in one direction from the intake chamber 60 to the output chamber 62. The main housing 50 is provided in the intake chamber 60 with an enlarged opening 75 which is sealed by a diaphragm member 78 extended thereacross mounted in a clamped relationship between the inside surface 51 of the wall 53 and a flange 79 of the main housing 50. A diaphragm plate 80 is secured as by adhesive or the like to the outer surface of the diaphragm member 78 for operation to be explained. The diaphragm member 78 is kept in the expanded or inactive position as by a large compression spring 81 having one end engagable with the intermediate wall 58 and the other end engagable with the diaphragm member 78. As shown in FIG. 4, the inlet and outlet channels 66 and 68, respectively, are positioned in a predetermined angular relationship for most efficient and effective operation as will be explained.

The anchor plate 56 is of a substantially square shape preferably constructed of heavy plate material having holes 82 about its periphery operable to secure the same as by bolt members 83 to the wall 53 of the fluid compartment 33. The anchor plate 56 is provided with an enlarged centrally positioned opening 84 adapted to receive the diaphragm plate 80 therein, and a pair of opposed attachment lugs 85 are secured adjacent the opening 84 as by welding or the like and provided with axially alined openings 87 therein. The attachment lugs 85 are adapted to receive a connecter pin 88 through the openings 87 for attachment of the actuator arm assembly 45 as will be explained.

The actuator arm assembly 45 is provided with an elongated actuator arm 90 held in the inactive position as by finger spring members 91 and 93 and pivotally mounted upon the connecter pin 88. The actuator arm 90 is provided with a central shaft section 94 having an actuator section 96 secured to the outer end and provided with an inner cam section 97. The actuator section 96 is of a generally paddle shape adapted to be contacted by animals using the same. As shown in FIG. 7, the shaft section 94 is of a generally elliptical shape in transverse cross section so as to provide the utmost strength in a horizontal plane and the weakest portion in a vertical plane for flexibility. The cam section 97 is provided with an outermost end surface 99 adapted to engage the diaphragm plate 80 during operation and is provided with upper and lower rib plates 103 and 104 and inner support plates 106 for rigidity. The cam surface 99 is provided with an equal distance radius from a connecter hole 108 as indicated by A and gradually increasing to a maximum radius indicated as B in the opposite direction for controlled actuation of the pump means 43. The actuator arm 90 is preferably constructed of a molded nylon material so as to achieve sufficient strength while maintaining flexibility plus durability. The spring members 91 and 93 are provided with a central coiled sections 109 having laterally extended finger sections 111 and 112 adapted to engage the cam section 97 and the anchor plate 56, respectively. The connecter pin 88 is extended through the hole 108, the openings 87 in the lugs 85, and the coiled sections 109 in the upper and lower spring members 91 and 93. A cotter pin 115 is used to anchor the connecter pin 88 in the assembled condition. Therefore, it is obvious that the finger sections 111 and 112 acting against the anchor plate 56 tends to maintain the actuator arm 90 in the inactive position, namely, extended substantially perpendicular to the diaphragm plate 80 and, operates to return the actuator arm 90 to its neutral position after usage.

As shown in FIG. 2, the conduit means 46 includes a first inlet conduit member 117 secured to the inlet channel 66 on the main housing 50 of the pump means 43 and an outlet conduit member 118 extended from the outlet channel 68. The inlet conduit member 117 has its outer input end provided with a filter member 120 so as to prevent impurities from entering the pump means 43. The outlet conduit member 118 extends upwardly through an outlet opening 122 in a top surface 123 of a fluid container compartment 33 and connected to a T-member 125 whereupon a first hose member 127 extends upwardly to a spray nozzle assembly 48. A second hose member 128 extends downwardly through an upright tube member 131 mounted within the fluid compartment 33 to a second nozzle spray assembly 48 mounted on the intermediate strut member 38. It is obvious that the conduit means 46 is preferably constructed of a polyethylene tubular material which is easy to attach and seal plus corrosive resistant which is highly desirable in this preferred usage.

As best shown in FIG. 8, each spray nozzle assembly 48 is substantially identical and only one need be described in detail. The nozzle assembly 48 includes a main irregularly shaped housing 132 having an input opening 134 to which is attached the respective hose member 127 or 128. Mounted within the housing 132 is a tubular member 136 threaded therein and having one end sealed by a check valve means 137 including a seat member 138 against a diaphragm member 139 biased into the closed position as by a compression spring 140 held therein by a combination cap and nut member 142. The main housing 132 is provided with an output section 144 having a filter and spray assembly 146 connected thereto. More particularly, the filter and spray assembly 146 includes spray directional plate member 149 held thereon as by a cap member 151 and having a filter element 153 mounted therein to prevent a small single orifice in the plate member 149 from becoming clogged by impurities.

As seen in the position of FIG. 8, the seat member 138 is biased to the closed position whereupon fluid entering through the opening 134 will not flow therethrough until a predetermined pressure is received to overcome the force of the compression spring 140. In the embodiment of this invention, the spring 140 has a resultant force of approximately 8 pounds per square inch whereupon, when this pressure is exceeded, the seat member 138 is moved to an open position so that fluid will flow through the tubular member 136 for discharge through the outlet orifice 155. On decrease of pressure to below eight pounds per square inch, it is obvious that the seat member 138 will close thereby maintaining a fluid supply within the conduit means at all times so that on the required increase in pressure, the fluid immediately is discharged from the respective spray nozzle assemblies 48.

In the use and operation of the automatic sprayer apparatus 15 of this invention, it is seen that the entire structure is preferably mounted within an entrance or exit opening in a dairy barn or the like. However, it is obvious that the same may be mounted anywhere such as a pasture area in a gate area in order to funnel or direct the animals to pass through the same for the proper actuation thereof. The pump and spray actuator means 22 and 24 are connected to respective ones of the fluid containing compartments 33 and the pump means 43 is specifically anchored to the respective anchor plates 56 in a predetermined angular relationship in order to achieve the proper operation of this invention. As shown in FIG. 4, the outlet channel 68 within the output chamber 62 of the pump means 43 is positioned at an angular relationship of approximately 55° from a vertical axis so as to provide a space above the upper edge of its opening of approximately ten percent of the entire volume of the output chamber 62. This area is additionally above the upper edge of the output check valve assembly 63. However, this upper area is adapted to trap air to be used as a compression force for proper operation of this invention. It is obvious that animals such as cows and the like moving between the housing means 20 would definitely strike the respective actuator arms 45 to cause angular movement thereof for pump actuation.

Figure 10:
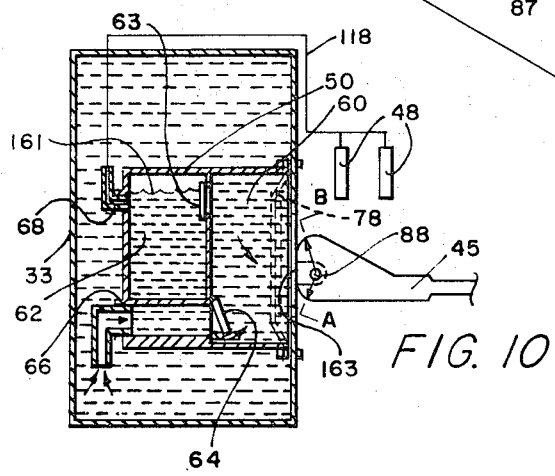
FIGS. 10, 11, and 12 are schematic diagrams illustrating the operation of the sprayer apparatus of this invention.
Figure 11:
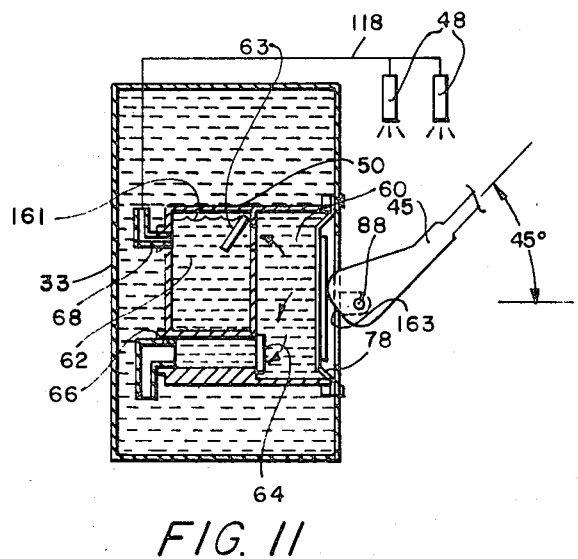

As best shown in the schematic diagram of FIG. 10, the position immediately after an actuation or returning the respective actuator arms 45 to the neutral position is illustrated whereupon the diaphragm member 78 is shown in dotted lines as moving outwardly toward the actuator arm 45. This causes an expansion in the input chamber 60 by force of the compression spring 81 against the diaphragm plate 80 whereupon fluid is pulled through the lower input check valve assembly 64 to maintain this chamber full of fluid at all times. On pivotal movement of the actuator arm 45 as shown in FIG. 11, the maximum radial distance from the pivot point or axis of the connecter pin 88 to the outermost cam surface 99 indicated at B is achieved within the first forty-five degree movement. Further movement thereof merely maintains the same distance between the pivot point and the diaphragm plate 80 whereupon the actuator arm 45 will pivot without lateral movement of the diaphragm plate 80. This causes a compression of the fluid within the input chamber 60 which is forced through the upper check valve assembly 63 and the lower check valve assembly 64 is concurrently forced to the closed position. Because of the fluid flow into the output chamber 62, this causes a compression of the air therein and raises the fluid level indicated generally at 161 (FIG. 11). Because the spray nozzle assemblies 48 are provided with their own check valve means and restricted openings, only a predetermined fluid will flow through the orifices 155 providing even uninterrupted flow.

Figure 12:
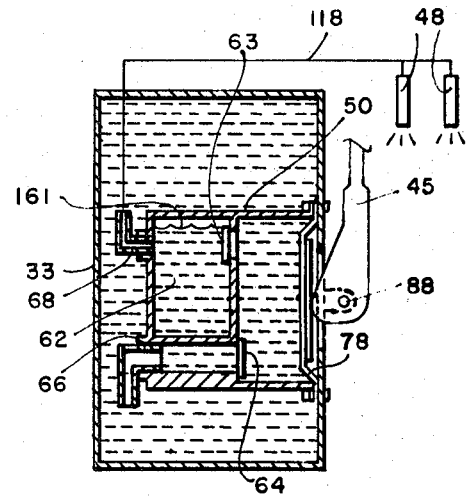

After movement of the actuator arm 45 to the initial 45° pivotal movement and even if the same further moves to the 90° position as shown in FIG. 12, it is obvious that the maximum fluid quantity has moved through the upper check valve assembly 63. The compressed air within the main housing 50 in the output chamber 62 acts to provide a force against the fluid therein to achieve a constant fluid flow to the respective nozzle assemblies 48. Without the proper angular positioning and relationship of the air pocket relative to the overall volume of the output chamber 62, the pump means 43 of this invention would not operate satisfactorily as the same would be sporadic in operation and would not continue to dispense fluid after the actuator arms 45 are moved to the full or even the neutral positions.

Additionally, by having the fluid actuation in the first forty-five degree arm movement, the animal moving therethrough does not get multiple doses of fluid by moving back and forth to pivotally move the respective actuator arms 45 against the diaphragm plates 80. Also, the novel structure of the cam section 97 operates in providing the equal radius indicated at A so that movement of the actuator arm 45 clockwise, as illustrated in FIGS. 10, 11, and 12, would not move the diaphragm plate 80 so that this device cannot be actuated by an animal moving therethrough in an opposite direction. Additionally, the cam section 97 is provided with a substantially flat central section 163 so as to rest in full contact with the diaphragm plate 80 in the inactive position for proper extension of the actuator arms 45.

It is seen that the proper angular positioning and nylon construction of the respective actuator arms 45 operates to provide horizontal stability but, due to the cross section thereof, vertical flexibility. This is desirable in that animals such as cattle or the like on placing their heads underneath the respective actuator arms 45 and raising the same, the novel angular relationship and flexibility operates to pivot the actuator arm 45 about the connecter pin 88 as best shown in dotted lines in FIG. 6.

As will be apparent from the foregoing description of the applicant's new and novel automatic sprayer apparatus, relatively inexpensive means of preferably fiberglass construction for weather and corrosion resistance is provided that is completely self-contained not relying on external power sources for its operation. Additionally, the spray apparatus of this invention is highly desirable in providing a safety feature as only a predetermined amount of fluid is dispensed therefrom which is essential in spraying insecticides and the like because an animal could sustain fatal injury on receiving a chemical overdose. It is obvious that the pump means of this invention may be made of any size and check valves of the nozzle assemblies may be adjustable so as to provide a desired pressure output relative to the pump size. Although the spray apparatus of this invention has been fully tested in usage with insecticides for cattle, it is highly efficient in dispensing exacting fluid amounts and could be used for many fluid dispensing operations.

While this invention is described in conjunction with preferred specific embodiments thereof, it will be understood that this description is intended to illustrate and not to limit the scope of the invention, which is defined in the following claims.

We claim:
1. A fluid dispensing apparatus, comprising:
 a. housing means defining a restricted area;
 b. said housing means having a fluid compartment mounted thereon;
 c. a pump and sprayer actuator means operably connected to said fluid compartment, said pump and sprayer actuator means including a diaphragm pump means and an actuator arm assembly operably connected thereto extended within the restricted area for movement to operate said pump means;
 d. spray nozzle assemblies connected to said pump means by a conduit means to dispense a fluid within the restricted area said spray nozzle assemblies each having a nozzle member provided with a check valve therein whereupon fluid is dispersed through said spray nozzle only on reaching a predetermined pressure to maintain fluid at each of said nozzle members and within said conduit means at all times; and
 e. said actuator arm assembly movable in one direction to directly contact said respective pump means to dispense fluid through said spray nozzle assemblies and inoperable to dispense fluid on movement in an opposite direction.

2. A fluid dispensing apparatus as described in claim 1, wherein:
 a. said pump means having a main housing provided with an inlet fluid chamber and an outlet fluid chamber separated by an intermediate wall and a diaphragm member mounted in said inlet chamber to be actuated by said actuator arms assembly;
 b. said intermediate wall having input and output check valve member mounted therein to regulate fluid flow between said outlet chamber and said inlet chamber on movement of said diaphragm member;
 c. said outlet chamber having an outlet channel connected to said spray nozzle assemblies;
 d. said inlet chamber connected by an input channel to an inlet conduit adapted to be placed within said fluid compartment to receive fluid therefrom; and
 e. said upper check valve assembly and said outlet channel adapted to be continuously submerged within fluid therein.

3. A fluid dispensing apparatus described in claim 2, wherein said output channel positioned in an angular relationship approximately 55° relative to a vertical axis whereupon an air pocket is formed within said output chamber to provide for compression thereof on actuation of said pump means to provide a steady fluid flow through said spray nozzle assemblies under the compressed air.

4. A fluid dispensing apparatus as described in claim 1, wherein:
   a. said pump means having a fluid input chamber and a fluid output chamber separated by an intermediate wall having first and second check valve members each permitting fluid flow in only one direction and a diaphragm member mounted within said input chamber;
   b. said actuator arm assembly having an actuator arm pivotally connected to an anchor plate mounted on said fluid compartment; and
   c. said actuator arm provided with a main shaft section having a cam section at one end engagable with said diaphragm member and a paddle section at the opposite end, said cam section provided with an outer cam surface adapted to contact said diaphragm member for movement on movement of said actuator in one direction and without movement of said diaphragm member on movement of said actuator arm in the opposite direction, and said actuator arm mounted on said anchor arm mounted on said anchor plate inclined relative to a vertical plane.

5. A fluid dispensing apparatus as described in claim 4, wherein:
   a. said shaft section of a generally elliptical shape in transverse cross section having the minimum dimension thereof extended in a vertical plane whereby said actuator arm is flexible upwardly;
   b. said actuator arm assembly having a pair of finger spring members secured, a connecter pin mounted in said anchor plate and pivotally supporting said actuator arm to bias the same into a neutral position extending substantially perpendicular to said diaphragm member; and
   c. said paddle section inclined and extended downwardly away from the direction of normal usage for proper operation thereof on animals through said housing means.

6. A fluid dispensing apparatus as described in claim 1, wherein:
   a. said actuator arm assembly having an actuator arm provided with a shaft section, a paddle section secured to said shaft section, and a cam section connected to said fluid compartment engagable with said pump means; and
   b. said cam section adapted for rotational movement relative said pump means, and said cam section having a cam surface provided with a first portion of generally equal radius in one direction and a second section of generally increasing radius in the other direction operable to actuate said pump means on pivotal movement thereabout in one direction but actuation of said pump means on movement in the opposite direction.

7. A fluid dispensing apparatus as described in claim 6, wherein said second section having the generally increasing radius with the maximum radius achieved in approximately the initial 45° pivotal movement of said actuator arm whereby further movement thereof in a full maximum of approximately 90° does not result in further actuation of said pump means whereby only a predetermined amount of fluid is dispensed from said apparatus.